US008482377B2

(12) United States Patent
Finkenzeller

(10) Patent No.: US 8,482,377 B2
(45) Date of Patent: Jul. 9, 2013

(54) DEVICE FOR CONTROLLING AN ACTUATOR

(75) Inventor: Klaus Finkenzeller, Unterföhring (DE)

(73) Assignee: Giesecke & Devrient GmbH, Munich (DE)

( * ) Notice: Subject to any disclaimer, the term of this patent is extended or adjusted under 35 U.S.C. 154(b) by 530 days.

(21) Appl. No.: 12/735,437

(22) PCT Filed: Jan. 16, 2009

(86) PCT No.: PCT/EP2009/050474
§ 371 (c)(1), (2), (4) Date: Jul. 16, 2010

(87) PCT Pub. No.: WO2009/090235
PCT Pub. Date: Jul. 23, 2009

(65) Prior Publication Data

US 2010/0308957 A1 Dec. 9, 2010

(30) Foreign Application Priority Data

Jan. 18, 2008 (DE) ......................... 10 2008 005 059

(51) Int. Cl.
*G05B 19/00* (2006.01)

(52) U.S. Cl.
USPC ....... 340/5.1; 340/3.9; 340/10.34; 340/636.2; 340/635; 607/61; 607/116

(58) Field of Classification Search
USPC ........................................... 340/10.34, 636.2
See application file for complete search history.

(56) References Cited

U.S. PATENT DOCUMENTS

| | | | |
|---|---|---|---|
| 5,479,799 | A | 1/1996 | Kilman et al. |
| 2007/0156204 | A1 | 7/2007 | Denker et al. |

FOREIGN PATENT DOCUMENTS

| | | |
|---|---|---|
| DE | 10348569 | 5/2005 |
| DE | 69830203 | 1/2006 |
| DE | 69634689 | 2/2006 |
| DE | 102004036358 | 2/2006 |
| DE | 102004039650 | 3/2006 |
| DE | 69832713 | 7/2006 |
| EP | 1209791 | 5/2002 |
| EP | 0802816 | 5/2005 |
| EP | 1056510 | 5/2005 |
| EP | 1011792 | 12/2005 |

OTHER PUBLICATIONS

English translation of Search Report issued by the German Patent and Trademark Office for German Patent Application No. 10 2008 005 059.8, dated Mar. 16, 2010 (4 pages).
English translation of International Preliminary Report on Patentability for International Application No. PCT/EP2009/050474, dated Aug. 10, 2010 (6 pages).
International Standard ISO/IEC 14443-4:2008(E), "Identification cards—Contactless integrated circuit cards—Proximity cards—Part 4: Transmission Protocol," Jul. 15, 2008, pp. 1-37.

*Primary Examiner* — Daniel Wu
*Assistant Examiner* — Frederick Ott
(74) *Attorney, Agent, or Firm* — Martine Penilla Group, LLP

(57) ABSTRACT

An apparatus includes an energy store for supplying an actuator, an antenna device for receiving, by contactless communication, energy for charging the energy store and one or more control signals comprising a command for triggering the actuator, and a control unit for controlling the supply of energy to the actuator on the basis of the control signals. After the triggering command has been received, the state of charge of the energy store is determined. When this state is less than a state of charge threshold value that is sufficient for triggering the actuator, a response signal to continue contactless communication is transmitted to the transmitting device via the antenna device. When this state is greater than or equal to the state of charge threshold value, the control unit controls the supply of energy from the energy store to the actuator so that it is possible to trigger the actuator.

25 Claims, 4 Drawing Sheets

DEVICE FOR CONTROLLING AN ACTUATOR

BACKGROUND OF THE INVENTION

1. Field of the Invention

The invention relates to a device for driving an actuator. Furthermore, the invention relates to a system consisting of such a device, an actuator and a transmission device as well as a transmission device for use in such a system. Moreover, the invention relates to a method for driving an actuator.

2. Description of Related Art

Triggering an actuator in a contactless manner is already known. Such actuators are used, for example, in electronic lock cylinders, with the actuator in the case of such an application being configured as a locking magnet controlled by an electronic circuit.

Document DE 103 48 569 A1 describes a device for driving an actuator based on a contactless communication of a transponder with a transmission device. The transponder shown in this document receives control signals via an antenna device, wherein the transponder is able to trigger the actuator depending on the control signals. The power transmitted by the transmission device via the contactless communication is in this case supplied to a power storage device in the transponder. The power of the power storage device is used for triggering the actuator. In this case, it may happen that the power storage device is not yet sufficiently charged to trigger the actuator when a control signal for triggering the actuator is received. In such a case, the actuator is not triggered by the control signal.

Today, NFC technology (NFC=Near Field Communication) is often used for contactless communication between a reading device and a transponder. In this regard, a method by means of which a transponder can transmit information to a reading device about the strength of the reading field is described in the standard ISO/IEC 14443-4. Corresponding bits of the INF field are being used by so-called WTX requests for this purpose. In most contactless applications, such as, for example, the use of RFID chips in passports or credit cards, information relating to the strength of the reading field is not, however, transmitted or even required.

SUMMARY OF THE INVENTION

It is the object of the invention to enable a contactless triggering of an actuator in a simple and reliable manner.

The device according to the invention comprises a power storage device, for example in the form of a capacitor, for supplying an actuator, an antenna device by means of which power for charging the power storage device and one or more control signals, which comprise a triggering command for triggering the actuator, can be received from a transmission device via a contactless communication, in particular based on the NFC technology, and a control unit for controlling the power supply from the power storage device to the actuator depending on the control signals. In this case, the device according to the invention is configured such that, during operation of the device, the charge state of the power storage device is determined after receiving the triggering command, wherein, in the case of a charge state of the power storage device lower than a charge state threshold value sufficient for triggering the actuator, a response signal for continuing the contactless communication is transmitted via the antenna device for reception by the transmission device, and wherein, in the case of a charge state of the power storage device higher than or equal to the charge state threshold value, the control device controls the power supply from the power storage device to the actuator such that a triggering of the actuator is enabled.

The invention is based on the idea of maintaining a contactless communication between a driving device and a transmission device until reaching a charge state value of the power storage device sufficient for triggering the controlled actuator, in order thus to ensure the triggering of the actuator even if a sufficient charge state of the power storage device has not yet been reached when the triggering command is received. By maintaining the contactless communication, the reception of power for charging the power storage device is continued, so that the actuator can finally be triggered when a sufficient charge state has been reached. The device according to the invention is advantageous in that a transmitted triggering command is always suitably processed, without an error message which is due to a power storage device that is not sufficiently charged being returned. The charge state threshold value sufficient for triggering the actuator can in this case be determined such that it ensures the triggering of the actuator with certainty, i.e. the charge state threshold value can also lie below the lower threshold value below which it is not possible to trigger the actuator. For example, the charge state threshold value can be substantially 100% charge of the power storage device. However, the charge state threshold value of the power storage device can also be determined such that the actuator cannot be triggered if the charge state of the power storage device is below this charge state threshold value.

In a preferred embodiment, the device is configured such that it transmits a confirmation signal via the antenna device for reception by the transmission device after the actuator is triggered. Preferably, the response signal in this case is an instruction for extending or restarting a waiting time during which the transmission device waits for the confirmation signal. The instruction for extending or restarting the waiting time can in particular be a WTX request in accordance with the ISO/IEC 14443-4 standard. The use of an instruction for extending or restarting a waiting time in particular has the advantage that the waiting time, and thus the contactless communication, can be extended on the level of the transmission protocol without the transmission device having to know special codes for continuing the contactless communication. However, it is also possible that the response signal is a special repeat instruction to cause the transmission device to retransmit the triggering command.

In a preferred variant of the device according to the invention, the charge state of the power storage device is determined by a charge state measuring unit for measuring the charge state, wherein the control unit is able to query the charge state of the power storage device from the charge state measuring unit, preferably via a measurement data interface. The use of such a charge state measuring unit is advantageous in that information regarding the charge state of the power storage device can optionally also be transmitted in the response signal.

Moreover, in another variant of the device according to the invention, a charging current measuring unit for measuring the charging current of the power storage device is provided, wherein information about the charging current can also be transmitted in the response signal to the transmission device. If the ISO/IEC 14443-4 standard is used, the information about the charge state or the charging current of the power storage device can be coded particularly simply by the bits of the WTX requests already provided for a power level indication.

In a particularly preferred embodiment, the control unit provided in the device according to the invention is an integrated circuit, in particular a chip for chip cards, whereby particularly compact dimensions of the device are obtained. In a preferred variant, the actuator is a component of a locking device, with the locking and opening of the locking device being triggered by the actuator.

Apart from the device just described, the invention further relates to a system comprising a transmission device, an actuator and the above-described driving device according to the invention, wherein the actuator can be triggered by the driving device via a contactlessly transmitted triggering command of the transmission device. Preferably, the system is configured such that the actuator can only be triggered after a successful authentication between the driving device and the transmission device, so that the system can also be used for security-sensitive applications.

The system according to the invention is preferably used in combination with a driving device which uses an instruction for extending or restarting a waiting time as a response signal for continuing the contactless communication. In this case, the transmission device, after receiving this instruction, contactlessly transmits a confirmation response to the driving device, which subsequently determines the charge state of the power storage device again, wherein, in the case of a charge state of the power storage device lower than the charge state threshold value, an instruction for extending or restarting the waiting time is transmitted again via the antenna device to the transmission device, and wherein, in the case of a charge state of the power storage device higher than or equal to the charge state threshold value, the control unit of the driving device supplies the power from the power storage device to the actuator for triggering the actuator. Preferably, the WTX response known from the ISO/IEC 14443-4 standard is used as a confirmation response in this case, wherein the WTX response is transmitted by the transmission device after receipt of the corresponding WTX request.

In a further embodiment of the system according to the invention, the transmission device is configured such that in the case where a repeat instruction is transmitted as a response signal by the driving device, the transmission device transmits the triggering command again.

Apart from the above-described system, the invention moreover comprises a transmission device for use in such a system, wherein the transmission device comprises a processing unit for a contactlessly received response signal for continuing the contactless communication, wherein the processing unit transmits a confirmation response in response to the response signal or transmits the triggering command again.

Preferably, the processing unit of the transmission device is capable of processing contactlessly received information about the charge state and/or the charging current of the power storage device if this information is transmitted. In this case, the processing unit preferably includes a signaling unit for signaling the charge state and/or the charging current for a user. In this case, the signaling unit can be a display panel or a display or also an acoustical signaling unit. The use of such a signaling unit is advantageous in that a user is informed about the current charge state of the power storage device and is able to see how much time is still required until the actuator is triggered. A user can also initiate appropriate countermeasures if an insufficient charging current is displayed, e.g., he can dispose the transmission device closer to the actuator in order to increase the charging current. Preferably, the processing unit is able to automatically increase the transmitting power of the transmission device if the charging current drops below a predetermined value.

Moreover, the invention includes a method for driving an actuator with a driving device, wherein power for charging a power storage device of the driving device and a triggering command for triggering the actuator is transmitted to the driving device from a transmission device via a contactless communication, wherein the charge state of the power storage device is determined after receiving the triggering command in the driving device, and, in the case of a charge state of the power storage device lower than a charge state threshold value sufficient for triggering the actuator, a response signal for continuing the contactless communication is transmitted from the driving device to the transmission device, whereas, in the case of a charge state of the power storage device higher than or equal to the charge state threshold value, the driving device connects the power storage device to the actuator, thus triggering the actuator.

BRIEF DESCRIPTION OF THE DRAWINGS

Exemplary embodiments of the invention are described below with reference to the attached figures.

In the figures.

DETAILED DESCRIPTION OF EMBODIMENTS OF THE INVENTION

The invention will be described below based on a so-called NFC communication (NFC=Near Field Communication), in which signals are exchanged wirelessly or contactlessly between a transponder comprising an RFID chip (RFID=Radio Frequency Identification) and a corresponding NFC reading device. Here, the transponder corresponds to the driving device and the NFC reading device to the transmission device in the sense of the claims.

Figure 1:
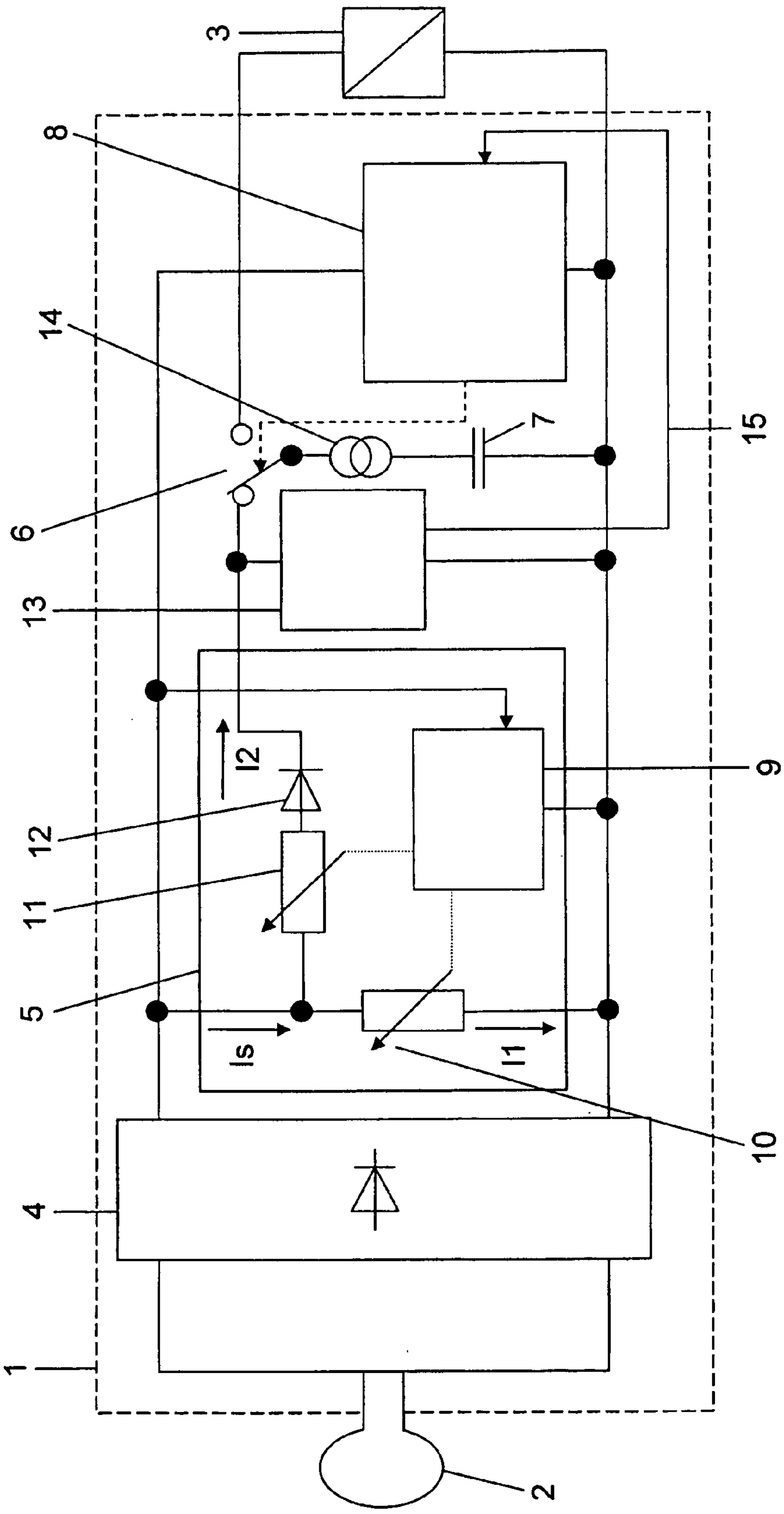
FIG. 1 shows a schematic representation of an embodiment of a device according to the invention for driving an actuator.

FIG. 1 shows a schematic circuit diagram of a transponder according to the invention. The structure of the transponder according to FIG. 1 to a large extent corresponds to the transponder shown in document DE 103 48 569 A1, with the entire content of the disclosure of that document being incorporated into the present application by reference. The transponder comprises a circuit arrangement 1 connected to an antenna device in the form of an antenna coil 2. Any other suitable antenna device, such as, for example, a printed antenna, can be used instead of an antenna coil 2. The device shown in FIG. 1 controls an actuator 3, which is connected with the circuit arrangement 1 for this purpose. The actuator 3 can be, for example, a locking magnet or any other optical, acoustical, electrothermal, electrochemical, thermomechanical, electromechanical, electromagnetic etc. device that cannot be supplied directly by the antenna coil 2 because of its high power consumption or because of its high starting current.

The circuit arrangement 1 comprises a rectifier 4 which on its AC side is connected to the antenna coil 2. A charging circuit 5, which on the output side can be connected to a capacitor 7 via a switch 6, is connected downstream from the rectifier 4 on its DC side. As an alternative to the charging circuit 5, the capacitor 7 can be connected to the actuator 3 via the switch 6. The switching state of the switch 6 is controlled by a transponder circuit 8 connected in parallel to the charging circuit. In this case, the transponder circuit is, in particular, an integrated circuit in the form of a chip for chip cards, e.g. of a smart card chip.

The charging circuit 5 comprises a regulating circuit 9 which is connected to the DC side of the rectifier 4 and controls a first variable resistor 10 as well as a second variable resistor 11. The first variable resistor 10 is connected in parallel to the DC side of the rectifier 4. The second variable resistor 11 connects one of the terminals of the DC side of the rectifier 4 to the switch 6 via a diode 12.

In contrast to the device shown in document DE 103 48 569 A1, the circuit arrangement 1 additionally comprises a charge state measuring unit 13 connected in parallel to the capacitor 7 and serving for measuring the charge state of the capacitor 7. For example, the measuring apparatus 13 is an analog-to-digital converter with which the voltage at the capacitor 7 can be measured. Moreover, a measurement data interface 15 is provided between the charge state measuring unit 13 and the transponder circuit 8, wherein the transponder circuit is able to query the charge state measured by the measuring unit 13 via this interface. The charge state measured via the measuring unit 13 is in this case used for controlling the triggering of the actuator 3, as will be explained in more detail below. Furthermore, a charging current measuring unit 14, which measures the charging current flowing through the capacitor, is connected in series with the capacitor 7, wherein the measured charging current can also be queried by the transponder circuit 8 via an interface (not shown).

The device shown in FIG. 1 is based on the following mode of operation: the antenna coil 2 is exposed to an alternating magnetic field in a frequency range of 13.56 MHz based on NFC technology. The alternating magnetic field is in this case generated by a transmission device, for example, by a reading device 21 with a connected antenna 22 shown in FIG. 2, this reading device being integrated into a mobile phone device 20. Because of the alternating magnetic field, a voltage is induced in the antenna coil 2 which is rectified by the rectifier 4. The field strength of the alternating magnetic field varies dependent on the distance of the transmission device from the antenna coil 2. The induced voltage and the rectified voltage produced therefrom, which, among other things, serves for supplying the transponder circuit 8, also vary accordingly. In order to obtain a constant supply voltage, the rectified voltage is adjusted to a constant predetermined value by the regulating circuit 9. For this purpose, the regulating circuit 9 controls the two variable resistors 10 and 11 such that the rectified voltage assumes the desired predetermined value. In this case, a total current Is flows through the two variable resistors 10 and 11, which in the first switching state shown in FIG. 1, in which the switch 6 connects the diode 12 with the capacitor 7, consists of a first partial current I1 through the first variable resistor 10 and a second partial current I2 through the second variable resistor 11. By the regulating circuit 9, the current Is is respectively adjusted to a value which is required for setting the rectified voltage to the desired predetermined value. Consequently, the current Is is positively determined and cannot be freely selected. However, the division of the current Is into the partial currents I1 and I2 can be freely selected.

In the device of FIG. 1, the division of the current into the partial currents I1 and I2 is done in such a way that the second partial current I2 is as large as possible in order to charge the capacitor 7 as quickly as possible. For this purpose, the first variable resistor 10 can first be set to an infinitely large value and the second variable resistor 11 can be controlled such that the second partial current I2 corresponds to the current Is required for the setting of the predetermined value for the rectified voltage. As the charge of the capacitor 7 increases, the second variable resistor 11 is set to an ever smaller value. Once the second variable resistor 11 has reached its minimum value, it is necessary also to reduce the value of the first variable resistor 10 in order to continue to constantly maintain the rectified voltage at the predetermined value. Accordingly, the second partial current I2 decreases and the first partial current I1 increases. In this way, the time required for charging the capacitor 7 can in each case be reduced to the minimum possible under the prevailing conditions. How long this time actually is depends critically on the field strength of the alternating magnetic field in the area of the antenna coil 2, because the induced voltage, and thus also the current Is required for setting the predetermined value for the rectified voltage, is determined thereby. Again, the current Is is maximally available as second partial current I2 for charging the capacitor 7. Only a short charging time is required given a high field strength. In the case of a lower field strength, the charging process takes correspondingly longer.

In order to trigger the actuator 3 of FIG. 1, a triggering command “activate actuator” is wirelessly transmitted by the transmission device and received by the antenna device 2. This triggering command, as a rule, causes the transponder circuit 8 to switch the switch 6 over to a switching position in which the capacitor 7 is discharged via the actuator 3. In this case, attention must be paid to the actuator 3 being triggered only if the capacitor 7 has a charge state sufficient for activating the actuator. According to the invention, when a triggering command is present, it is ensured that a continuation of the charging process of the capacitor is caused via an appropriate communication between the transmission device and the transponder if the capacitor is insufficiently charged, until finally the actuator is triggered if there is a sufficient charge. A corresponding course of such a communication is described below with reference to FIG. 3.

Figure 2:
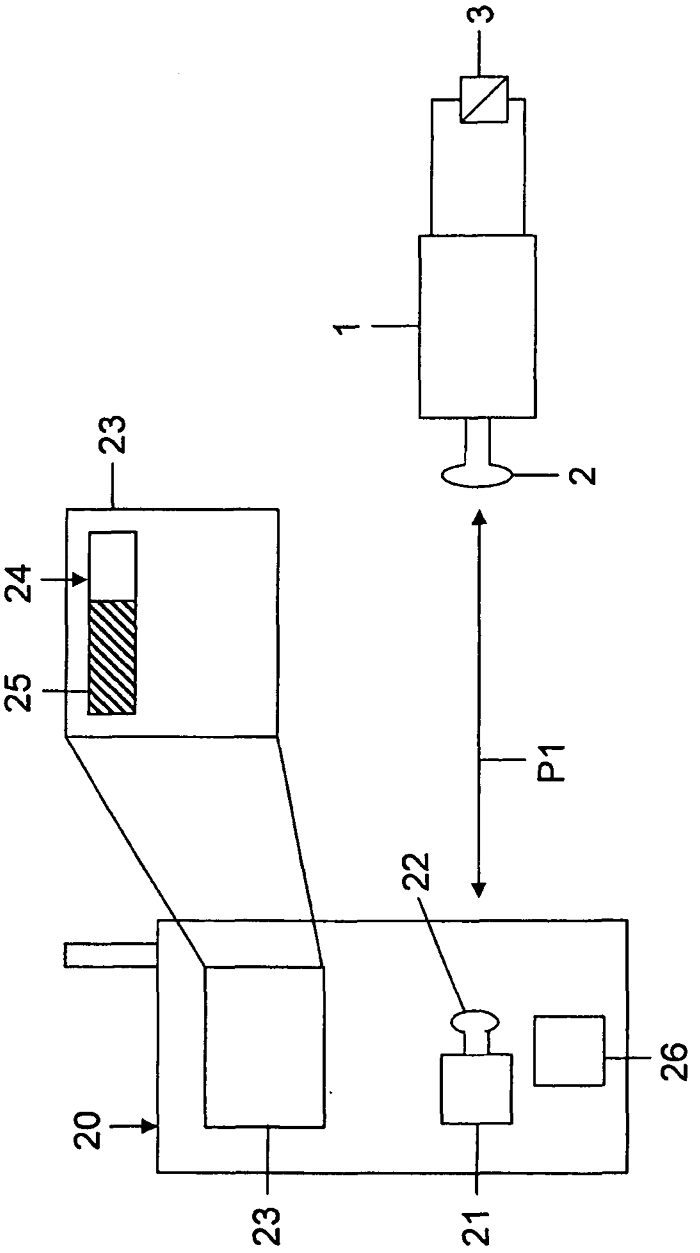
FIG. 2 shows a schematic representation of the contactless communication between the device according to FIG. 1 and a transmission device in a mobile phone device.

FIG. 2 schematically shows the communication of the transponder according to FIG. 1 with a corresponding reading device 21 which has an antenna device 22 and is integrated into the mobile phone device 20. Of the transponder, FIG. 2 schematically shows the circuit arrangement 1 as well as the antenna device 2. Furthermore, the connection of the transponder to the actuator 3 is shown. The double arrow P1 in FIG. 2 indicates the contactless NFC communication between the reading device and the transponder, the communication taking place in accordance with the ISO/IEC 14443-4 standard. In a preferred variant of the invention described below, the charge state and optionally also the charging current of the capacitor 7 is additionally transmitted to the reading device during the communication between the transponder and the transmission device, with the charge state and the charging current having been measured by the measuring devices 13 and 14, respectively, shown in FIG. 1. These measured quantities can be displayed in the display 23 of the mobile phone device 20, an enlarged view of the display 23 being shown in FIG. 2. It can be seen that the charge state of the capacitor is currently shown on the display in a horizontal display field 24 in the form of a hatched progress bar 25. If the bar 25 fills the display field 24 completely, the capacitor is charged to 100%. The mobile phone device 20 further contains a security element 26 in the form of a security chip, with which a cryptographic authentication is ensured between the mobile phone device and the transponder, so that only authorized reading devices are able to trigger the actuator 3 via the contactless NFC communication. The use of the security element 26 is necessary especially in security-sensitive applications in which the actuator 3 is, for example, a component of a locking device that is supposed to be opened or closed only by authorized persons.

Figure 3:
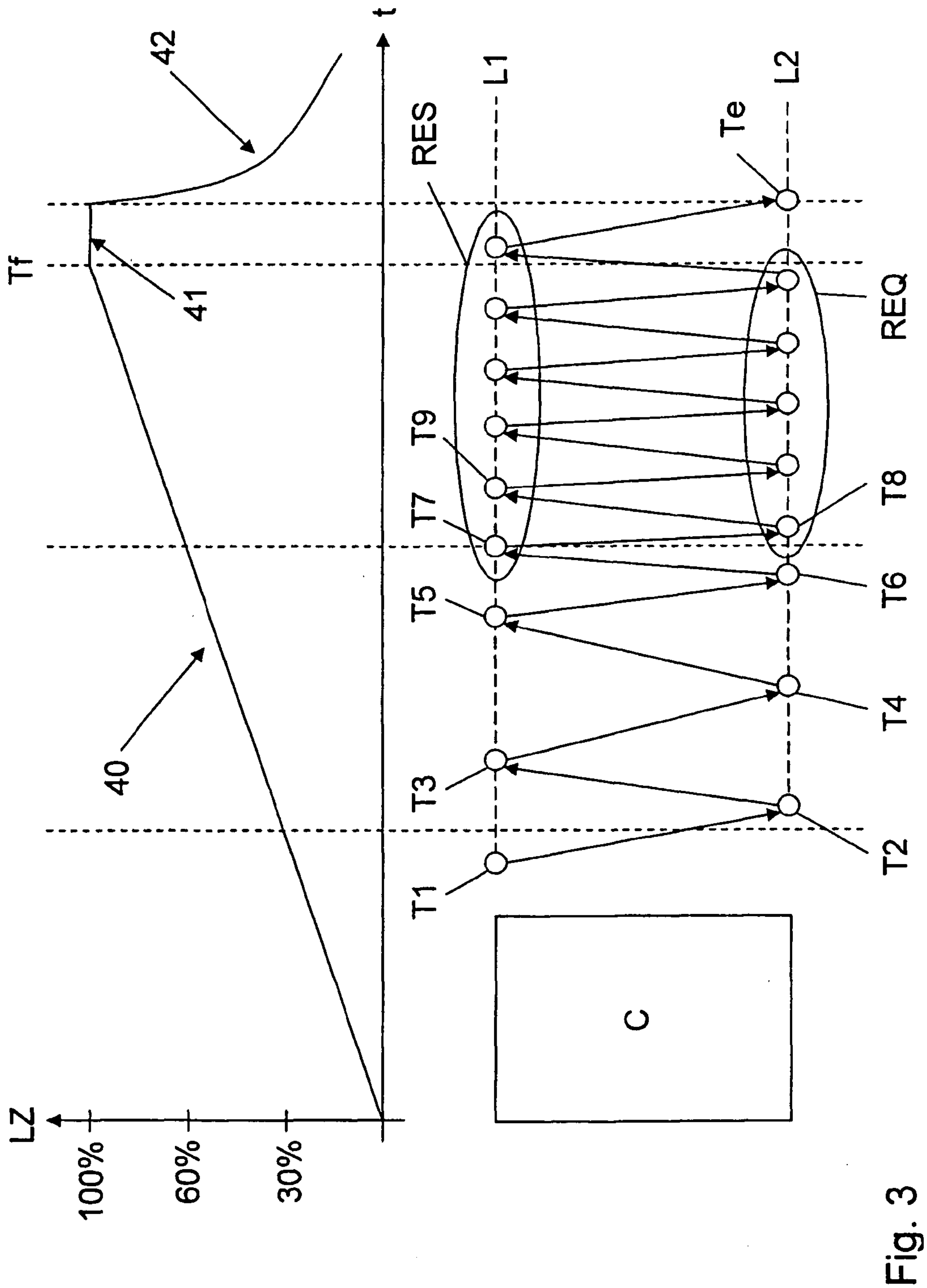
FIG. 3 shows a schematic representation of the timing of a communication between a transponder according to the invention and a transmission device.

FIG. 3 shows the timing of a communication according to the invention for triggering the actuator 3 based on the ISO/IEC 14443-4 protocol. In this case, the time t is plotted along the horizontal axis in FIG. 3, with the charge state LZ of the charge storage device in the form of a capacitor 7 being shown in percent above the axis t and the timing of signaling between the NFC reading device 21 and the transponder according to the invention being shown below the time-axis t. In this case, the points in time at which the reading device transmits signals are shown along the line L1, and the points in time at which the transponder transmits signals are shown along the line L2. The points in time along the lines L1 and L2 are in this case represented by circles, and the transmission of the signals is indicated by corresponding obliquely extending arrows.

If the transponder according to the invention arrives in the response field of the reading device 21, a communication relationship between the transponder and the reading device is first established by the instruction sequence "Request→Anticollision→ATS". The establishment of the communication relationship is represented schematically by a corresponding rectangle C in FIG. 3. While the communication relationship is being established, a charging current already flows into the charge storage device 7, so that the charge state of the charge storage device steadily increases, as is indicated by the rising line 40 in the upper part of FIG. 3. After the communication relationship has been established, the mutual authentication between the reading device and the batteryless actuator begins starting at the point in time T1. In the process, the above-described security element 25 is being used. Authentication is carried out through a known instruction sequence based on the command sequence "Get Challenge (point in time T1)→Set Random Number (point in time T2)→Authentication (point in time T3)→Authentication (point in time T4)".

Immediately after the successful completion of authentication, the reading device transmits a triggering command ("activate actuator") to the transponder to activate the actuator. This command is transmitted at the point in time T5. In the scenario shown in FIG. 3, the actuator can only be triggered given a charge of the charge storage device of substantially 100%, wherein, however, the command "activate actuator" is sent at a point in time at which the charge state of the charge storage device is only at about 50%. In order to prevent the actuator from not being triggered despite the triggering command due to a lack of charge of the capacitor, according to the invention, the charge state of the charge storage device 7 is first checked when the triggering command "activate actuator" is processed. If the charge state—as is shown in FIG. 3—is too low, it is provided not to transmit an error message, but to transmit a WTX request (WTX=Waiting Time Extension) prior to the expiry of the corresponding frame waiting time of the ISO/IEC 14443-4 protocol in order to restart or extend the frame waiting time.

The first transmission of this WTX request from the transponder, according to FIG. 3, takes place at the point in time T6. The reading device confirms this WTX request with a corresponding WTX response, which is transmitted at the point in time T7. Following the reception of the WTX response, the transponder checks again whether the charge state of the charge storage device 7 suffices for triggering the actuator. In the scenario of FIG. 3, this is not the case yet, so that a WTX request is again transmitted to the reading device at the point in time T8, which is once again answered by a corresponding WTX response at the point in time T9. As can be seen from FIG. 3, the steps of mutually exchanging WTX requests and WTX responses are repeated until a 100% charge of the charge storage device is detected in the transponder. The 100% charge is indicated by the horizontal line 41 in FIG. 3. Furthermore, the points in time of mutual transmission of WTX requests and WTX responses are indicated in FIG. 3 by corresponding ellipses REQ and RES, respectively, which encircle the points in time of transmission of the corresponding requests and responses. In the embodiment described here, the requests also transmit information about the charge state. The requests in the ellipse REQ in this case indicate a charge state of the charge storage device of 60%, whereas the request transmitted at the point in time T6 specifies a charge state of 30%.

According to FIG. 3, the capacitor is fully charged at the point in time Tf, with the full charge being detected in the transponder at the point in time Te. At this point in time, the transponder circuit 8 then closes the switch 6 in order to supply the power of the capacitor 7 to the actuator 3. At the same time, a corresponding return code (e.g. "90 00") is transmitted to the reading device for confirming the complete execution of the command "activate actuator". The subsequent discharge of the capacitor is indicated in FIG. 3 by the falling edge 42.

A preferred variant of the invention provides that information about the charge state and the charging current are also transmitted with the WTX requests sent by the transponder, wherein the charge state and the charging current, respectively, can be measured by the measuring devices 13 and 14, respectively, of FIG. 1. Preferably, the bits 7 and 8 of the WTX request according to the ISO/IEC 14443-4 standard, which are provided for the so-called "power level indication", are used for transmitting the charge state and the charging current, respectively. A possible coding of the charge state and the charging current, respectively, is shown in the following table:

| Bit 8 | Bit 7 | Meaning |
|---|---|---|
| 0 | 0 | Function not supported |
| 0 | 1 | Charging current insufficient; field energy too low |
| 1 | 0 | Charge storage device charged 30% (0 . . . 50%) |
| 1 | 1 | Charge storage device charged 60% (50 . . . 99%) |

A representation of the charge state of 100% is not required because the actuator is immediately triggered in this state.

Figure 4:
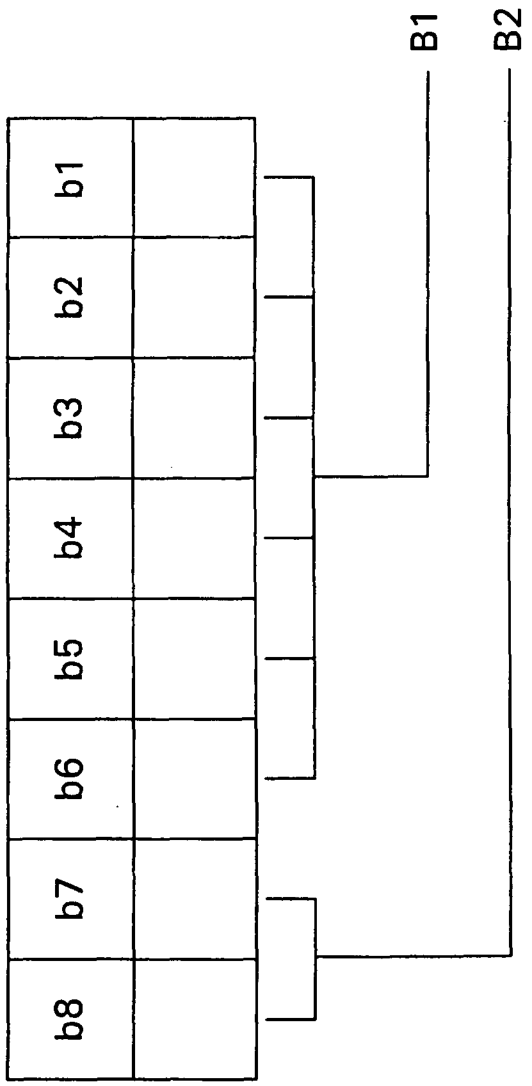
FIG. 4 shows a schematic representation of the INF field of a WTX request in accordance with the ISO/IEC 14443-4 standard.

The structure of a WTX request in accordance with the ISO/IEC 14443-4 standard is shown in FIG. 4. The bit range B1, which comprises the bits b1 to b6, in this case codes the so-called WTXM value used for defining a temporary frame waiting time. The bit range B2 denotes the bits b7 and b8 provided for power level indication. According to the ISO/IEC 14443-4 standard, the following coding is provided for the bit assignments:

b8=0, b7=0: Device does not support power level indication
b8=0, b7=1: Insufficient power for full functionality
b8=1, b7=0: Sufficient power for full functionality
b8=1, b7=1: More than sufficient power for full functionality.

The interpretation of the "power level indication" by the reading device is optional in this case. According to the invention, the bit assignments are preferably interpreted based on the above table.

Possibly, the field strength of the alternating magnetic field emitted by the reading device is too low to generate a sufficient charging current for charging the charge storage device.

It can therefore be provided, according to the above table, that the state of an insufficient charging current is signaled to the reading device by means of a corresponding coding of bit 7 and bit 8 in the WTX request (see coding "bit 8=0, bit 7=1"). Consequently, the reading device may increase its transmission power if possible. In those cases in which it is not possible to increase the transmission power, e.g., when the reading device is provided in a battery-powered mobile phone device, the user of the reading device can be given a signal that the charging current is insufficient, so that, consequently, the user better aligns the antenna of the reading device in relation to the batteryless actuator in order thus to improve the power transmission between the reading device and the transponder. A corresponding signalling of an insufficient charging current or of the progress in charging the capacitor can be given, for example, by an acoustic signal or a display field on the reading device. A variant of the display of the charging progress by means of a bar was already described above with reference to FIG. 2. In addition to the progress bar or instead of the progress bar, the charging current may optionally be indicated optically in this case, in order to enable the user to optimize the alignment of the antenna of the reading device in relation to the transponder.

In a variant of the invention, a special return code can optionally be sent instead of the WTX request from the transponder, instead of the above-described use of the WTX requests or WTX responses for ensuring a sufficient charge state for triggering the actuator. The information that the previously sent triggering command of the reading device could not be executed is coded in the return code. Consequently, the reading device then sends the command "activate actuator" again, with this mechanism, in analogy to the use of the WTX request and the WTX response, being repeated until the charge storage device is sufficiently charged and the triggering command can finally be executed successfully by activating the actuator. Optionally, the charge state of the charge storage device as well as the charging current can also be transmitted in the return code. The charge state of the charge storage device and, optionally, the charging current can also be signaled on the reading device in this variant, again, for example, on the display of the mobile phone device into which the reading device is integrated.

The particulars contained in the above description of sample embodiments should not be construed as limitations of the scope of the invention, but rather as exemplifications of preferred embodiments thereof. Accordingly, the scope of the invention should be determined not by the embodiments illustrated, but by the appended claims and their legal equivalents.

The invention claimed is:

1. A device for driving an actuator, comprising a power storage device for supplying the actuator, an antenna device, by means of which power for charging the power storage device and one or more control signals, which comprise a triggering command for triggering the actuator, can be received from a transmission device via a contactless communication, and a control unit for controlling the power supply from the power storage device to the actuator depending on the control signals, wherein the device is configured such that the charge state of the power storage device is determined after receiving the triggering command, wherein, in the case of a charge state of the power storage device lower than a charge state threshold value sufficient for triggering the actuator, a response signal for continuing the contactless communication is transmitted via the antenna device for reception by the transmission device, wherein, in the case of a charge state of the power storage device higher than or equal to the charge state threshold value, the control device controls the power supply from the power storage device to the actuator such that a triggering of the actuator is enabled, and wherein the transmitted triggering command is suitably processed without an error message, which is due to the power storage device that is not sufficiently charged, being returned.

2. The device according to claim 1, wherein the contactless communication is an NFC communication.

3. The device according to claim 1, wherein the charge state threshold value of the power storage device is set such that the actuator cannot be triggered if the charge state of the power storage device is below the charge state threshold value.

4. The device according to claim 1, wherein the device is configured such that it transmits a confirmation signal via the antenna device for reception by the transmission device after the actuator is triggered.

5. The device according to claim 4, wherein the response signal is an instruction for extending or restarting a waiting time during which the transmission device waits for the confirmation signal.

6. The device according to claim 5, wherein the instruction for extending or restarting the waiting time is a WTX request in accordance with the ISO/IEC 14443-4 standard.

7. The device according to claim 6, wherein the response signal contains information about at least one of the charge state and the charging current of the power storage device, and the bits of the WTX request provided for power level indication contain this information.

8. The device according to claim 1, wherein the response signal is a repeat instruction to cause the transmission device to retransmit the triggering command.

9. The device according to claim 1, wherein the device comprises a charge state measuring unit for measuring the charge state of the power storage device.

10. The device according to claim 9, wherein the control unit is able to query the charge state of the power storage device from the charge state measuring unit via a measurement data interface.

11. The device according to claim 9, wherein the response signal contains information about the charge state of the power storage device.

12. The device according to claim 1, wherein the device comprises a charging current measuring unit for measuring the charging current of the power storage device.

13. The device according to claim 12, wherein the response signal contains information about the charging current of the power storage device.

14. The device according to claim 1, wherein the control unit is an integrated circuit, in particular a chip for chip cards.

15. The device according to claim 1, wherein the actuator is a component of a locking device.

16. A system comprising a transmission device, an actuator and a driving device for driving the actuator, wherein the actuator can be triggered by the driving device by means of a contactlessly transmitted triggering command of the transmission device, wherein the driving device comprises a power storage device for supplying the actuator, an antenna device, by means of which power for charging the power storage device and one or more control signals, which comprise the triggering command for triggering the actuator, can be received from the transmission device via a contactless communication, and a control unit for controlling the power supply from the power storage device to the actuator depending on the control signals, wherein the device is configured such that the charge state of the power storage device is determined after receiving the triggering command, wherein, in the case of a charge state of the power storage device lower than a charge state threshold value sufficient for triggering the actuator, a response signal for continuing the contactless communication is transmitted via the antenna device for reception by the transmission device, wherein, in the case of a charge state of the power storage device higher than or equal to the charge state threshold value, the control device controls the power supply from the power storage device to the actuator such that a triggering of the actuator is enabled, and wherein the transmitted triggering command is suitably processed without an error message, which is due to the power storage device that is not sufficiently charged, being returned.

17. The system according to claim 16, wherein the system is configured such that the actuator can only be triggered after a successful authentication between the driving device and the transmission device.

18. The system according to claim 16 wherein the driving device is configured such that the driving device transmits a confirmation signal via the antenna device for reception by the transmission device after the actuator is triggered, the response signal is an instruction for extending or restarting a waiting time during which the transmission device waits for the confirmation signal, and the system is configured such that the transmission device, after receiving the instruction for extending or restarting of the waiting time, contactlessly transmits a confirmation response to the driving device, and the driving device subsequently determines the charge state of the power storage device again after receiving the confirmation response, wherein, in the case of a charge state of the power storage device lower than the charge state threshold value, an instruction for extending or restarting the waiting time is transmitted again via the antenna device to the transmission device, and wherein, in the case of a charge state of the power storage device higher than or equal to the charge state threshold value, the control unit supplies the power of the power storage device to the actuator for triggering the actuator.

19. The system according to claim 18, wherein the instruction for extending or restarting the waiting time is a WTX request in accordance with the ISO/IEC 14443-4 standard, and the transmission device is configured such that it transmits a WTX response in accordance with the ISO/IEC 14443-4 standard as a confirmation response after the WTX request has been received.

20. The system according to claim 16, wherein the response signal is a repeat instruction to cause the transmission device to retransmit the triggering command, and the transmission device is configured such that it transmits the triggering command again after receiving a repeat instruction.

21. A transmission device for use in the system according to claim 16, wherein the transmission device comprises a processing unit for a contactlessly received response signal for continuing the contactless communication, wherein the processing unit transmits a confirmation response in response to the response signal or transmits the triggering command again.

22. The transmission device according to claim 21, wherein the processing unit is capable of processing contactlessly received information about at least one of the charge state and the charge current of the power storage device.

23. The transmission device according to claim 22, wherein the processing unit includes a signaling unit for signaling the at least one of the charge state and the charging current for a user.

24. The transmission device according to claim 22, wherein the processing unit is configured such that the processing device increases the transmitting power of the transmission device if the charging current drops below a predetermined value.

25. A method for driving an actuator with a driving device, wherein power for charging a power storage device of the driving device and a triggering command for triggering the actuator are transmitted to the driving device from a transmission device via a contactless communication, wherein the charge state of the power storage device is determined after receiving the triggering command in the driving device, wherein, in the case of a charge state of the power storage device lower than a charge state threshold value sufficient for triggering the actuator, a response signal for continuing the contactless communication is transmitted from the driving device for reception by the transmission device, wherein, in the case of a charge state of the power storage device higher than or equal to the charge state threshold value, the driving device connects the power storage device to the actuator, thus triggering the actuator, and wherein the transmitted triggering command is suitably processed without an error message, which is due to the power storage device that is not sufficiently charged, being returned.

* * * * *